US006814179B2

(12) United States Patent
Corrigan et al.

(10) Patent No.: US 6,814,179 B2
(45) Date of Patent: Nov. 9, 2004

(54) SEISMIC SENSING APPARATUS AND METHOD WITH HIGH-G SHOCK ISOLATION

(75) Inventors: Michael A. Corrigan, The Woodlands, TX (US); Jeffrey C. Gannon, Houston, TX (US); Leo M. Dekkers, Houston, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/865,797

(22) Filed: May 25, 2001

(65) Prior Publication Data

US 2002/0175020 A1 Nov. 28, 2002

(51) Int. Cl.[7] .................................................. G01V 1/16
(52) U.S. Cl. ..................... 181/112; 181/104; 181/122; 181/401; 181/105; 367/35
(58) Field of Search ............................ 181/112, 108, 181/104, 122, 207, 208, 209, 401, 105, 102; 367/14, 25, 35, 81, 86; 340/856.4, 855.6; 73/152.47, 152.58

(56) References Cited

U.S. PATENT DOCUMENTS

| 3,144,090 A | * | 8/1964 | Mazzagatti et al. ........ 367/155 |
| 3,615,961 A | * | 10/1971 | Meyer et al. .............. 156/62.2 |
| 3,911,388 A | * | 10/1975 | Crump et al. ............... 367/180 |
| 4,001,771 A | * | 1/1977 | Amrine et al. .............. 367/129 |
| 4,163,206 A | * | 7/1979 | Hall, Jr. ....................... 367/160 |
| 4,301,887 A | * | 11/1981 | Fiske, Jr. ..................... 181/107 |
| 4,310,066 A | * | 1/1982 | Won ............................ 181/121 |
| 4,534,020 A | * | 8/1985 | O'Brien ....................... 367/188 |
| 4,596,921 A | * | 6/1986 | Hersh et al. ................. 392/385 |
| 4,608,675 A | | 8/1986 | Chelminski .................. 367/189 |
| 4,779,852 A | * | 10/1988 | Wassell ....................... 267/125 |
| 4,882,933 A | * | 11/1989 | Petersen et al. ......... 73/514.13 |
| 4,928,263 A | * | 5/1990 | Armstrong et al. ......... 367/118 |
| 5,003,517 A | * | 3/1991 | Greer, Jr. .................... 367/178 |
| 5,044,460 A | * | 9/1991 | Kamata et al. .............. 181/401 |
| 5,044,461 A | | 9/1991 | Aronstam ................... 181/109 |
| 5,046,056 A | | 9/1991 | Sallas et al. ................ 367/166 |
| 5,189,642 A | | 2/1993 | Donoho et al. .............. 367/15 |
| 5,302,782 A | * | 4/1994 | Owen .......................... 181/122 |
| 5,463,193 A | * | 10/1995 | Carpenter et al. .......... 181/207 |
| 5,633,960 A | | 5/1997 | Lagakos et al. .............. 385/12 |
| 6,108,274 A | * | 8/2000 | Pearce ......................... 367/157 |
| 6,315,062 B1 | * | 11/2001 | Alft et al. ..................... 175/45 |
| 6,370,084 B1 | * | 4/2002 | Cray ........................... 367/141 |

FOREIGN PATENT DOCUMENTS

EP          566758 A1 * 10/1993  ........... B60R/21/00

* cited by examiner

Primary Examiner—Shih-Yung Hsieh
Assistant Examiner—Edgardo San Martin
(74) Attorney, Agent, or Firm—Madan, Mossman & Sriram, P.C.

(57) ABSTRACT

A method and apparatus for isolating a seismic sensor module from high-g shock loads such as those encountered during handling, deployment and retrieval of the module. The sensor module includes one or more MEMS accelerometers in an electronics package. The electronics package is housed within a module case. And one or more isolators are disposed between the electronics package and the module case to provide shock isolation.

40 Claims, 5 Drawing Sheets

SEISMIC SENSING APPARATUS AND METHOD WITH HIGH-G SHOCK ISOLATION

BACKGROUND OF THE INVENTION

1. Field of the Invention

This invention relates generally to geologic survey sensors and more particularly to seismic sensors.

2. Description of the Related Art

Oil and gas exploration includes the acquisition of formation characteristics by conducting seismic surveys. When seismic surveys are conducted on land, sensors are positioned in a survey area. Well-known techniques such as using vibrator trucks or explosives are employed to generate an acoustic wave. The acoustic wave travels through earth formations and is partially reflected at formation discontinuities. Various sensor types are used to sense the reflected wave as it returns to the surface. The senor outputs a signal indicative of the wave, and a surface controller is then typically used to record the signal.

A typical sensor used is a velocity sensor, also known in the art as a geophone. A velocity sensor is a spring-mass sensor that uses relative motion between a mass and a coil to generate an analog output signal. When an acoustic wave contacts the sensor, the sensor housing moves. An internal mass suspended by a spring within the housing, tends to remain motionless as the housing moves relative to the internal mass. In a geophone, the internal mass is an electrically conductive coil having output leads and the housing contains an attached magnet. The relative motion of the magnet with respect to the coil produces a voltage output on the output leads. The resultant voltage produced is proportional to the velocity of the relative motion.

An alternative to the velocity-type geophone is an acceleration sensor called an accelerometer. Recent advances in accelerometer technology have resulted in the development of micro-electromechanical systems ("MEMS") based accelerometers. These MEMS accelerometers have been used in seismic sensor modules with some performance features comparable to a geophone-based module.

A drawback of a typical MEMS sensor module is that the module is sensitive to large amplitude, short period mechanical shock known as high-g shock inputs. Such inputs are commonly encountered during handling of seismic equipment in the field during transportation and insertion ("planting") of sensor modules in the ground. These high-g shocks are typically two and one half orders of magnitude larger than seismic energy sensed by the accelerometer, which may damage or destroy accelerometers housed in the modules. High-g as used herein is distinguished from sub-g, which is defined as any input force less than 1 g (1× the force due to gravity).

Another problem encountered in a typical accelerometer is certain noise encountered during operation caused by resonances of the module structure. There is a need for a seismic sensor having noise abatement capability for noise created by system resonance.

SUMMARY OF THE INVENTION

The present invention described below addresses some or all of the drawbacks described above by providing a seismic sensor having single or multi-axis sensitivity and which can withstand high-g shock during handling and transport, and which can subsequently reduce module noise while measuring sub-g acoustic waves when the module is planted.

In one aspect of the invention, an apparatus for sensing seismic waves in the earth is provided. The apparatus includes a housing with one or more seismic sensors disposed in the housing. At least one isolator is coupled to the one or more seismic sensors for isolating the one or more seismic sensors from high-g shock induced in the housing.

In another aspect of the invention, a seismic sensor module tolerant to high-g shock inputs is provided. The module comprises a module case and a sensor assembly housed by the module case. An inertial mass is coupled to at least one seismic sensor in the sensor assembly, and at least one isolator is coupled to the sensor assembly and the module case.

Another aspect of the invention provides a seismic sensor module that comprises a module case and a sensor assembly coupled to the module case. The sensor assembly includes at least one seismic sensor, and an inertial mass is coupled to the sensor assembly.

A sensor module tolerant to high-g shock inputs is provided in another aspect of the invention, wherein the module comprises a module case and a sensor assembly within the module case. The sensor assembly includes an inertial mass coupled to the module case, and at least one seismic sensor coupled to the inertial mass. An isolation layer is coupled to the module case and the sensor assembly such that the sensor assembly remains substantially motionless relative to the module case when an input force of less than a predetermined level is applied to the module case.

A method of isolating one or more seismic sensors in a seismic sensor assembly from high-g shock loads while maintaining sensitivity to seismic waves is provided in another aspect of the present invention. The method comprises providing a housing for the seismic sensor assembly, installing one or more seismic sensors in the housing, and providing an isolator between the one or more sensors and the housing.

BRIEF DESCRIPTION OF THE DRAWINGS

The novel features of this invention, as well as the invention itself, will be best understood from the attached drawings, taken along with the following description, in which similar reference characters refer to similar parts, and in which.

DETAILED DESCRIPTION OF THE INVENTION

Figure 1:
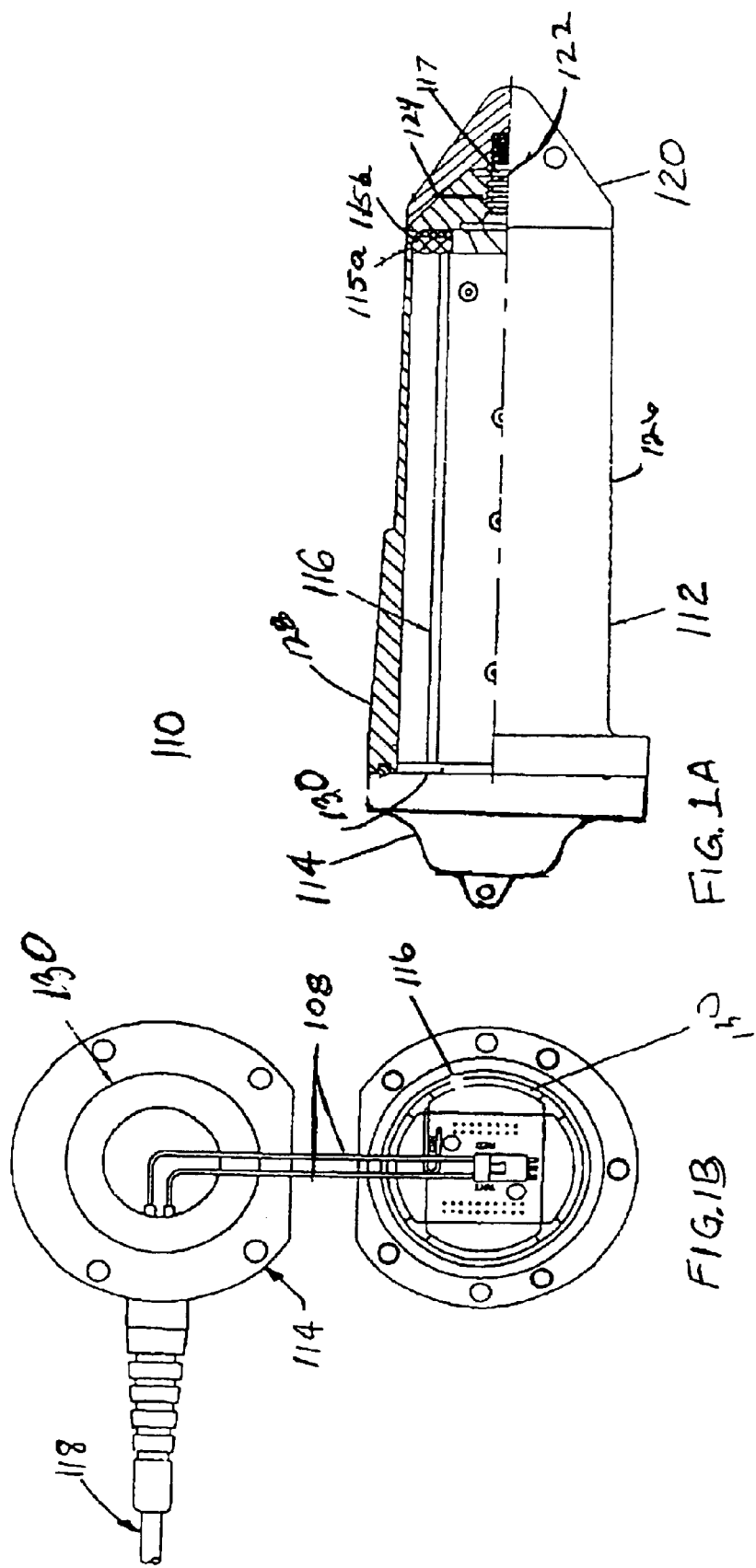
FIGS. 1A and 1B show a seismic sensor module according to the present invention.
Figure 2:
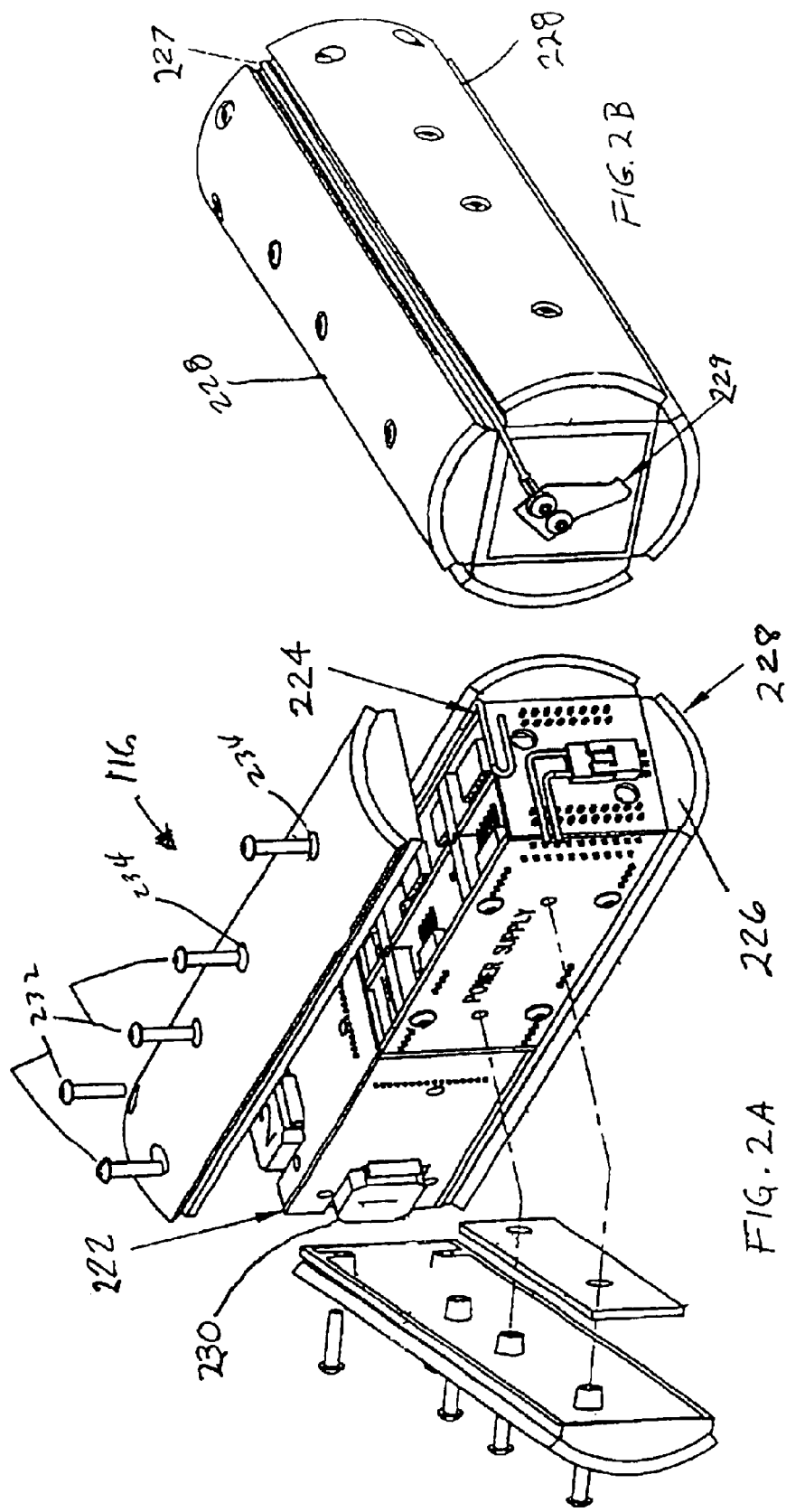
FIGS. 2A and 2B are elevation views of a sensor electronics package suitable for use in the sensor module of FIG. 1A.

FIGS. 1A and 1B show a seismic sensor module according to the present invention. The sensor module 110 includes a module case 112 coupled to a module cap 114. The module cap 114 provides an access into the module case 112 for one or more electrical conductors 108 of a telemetry cable 118. The module cap 114 is shown connected to the module case 112 in FIG. 1A. The module cap 114 is shown unconnected in FIG. 1B. The telemetry cable 118 is coupled to the module cap 114 by known methods. Housed in the module case 112 and module cap 114 is a sensor electronics package 116, which will be described in more detail later with respect to FIGS. 2–4.

In a preferred embodiment, the module case 112 is made from polybutylene terephthalate ("PBT"). Alternatively, the module case may be manufactured from any other suitable material such as a plastic, a metal or a metal alloy. The module case 112 has a tapered outer surface 126 to provide a compressed fit with the ground while minimizing the effort needed to deploy and retrieve the sensor module 110.

In one embodiment, the module case 112 is constructed with a wall thickness that allows for wall flexure to provide damping of high-g shock input. The outer surface 126 may include a longitudinal ridge 128. The longitudinal ridge 128 provides a key-type fit to prevent inadvertent rotation after the sensor module 110 is inserted into the ground.

The module cap 114 may be constructed using materials substantially similar to those used to construct the module case 112. In a preferred embodiment, the module cap 114 and module case 112 provide a hermetic seal when coupled.

A module tip 120 is coupled to a distal end of the module case 112. The module tip 120 preferably is substantially conical in shape or otherwise tapered for ease of insertion into the earth. The sensor electronics package 116 and module tip 120 are mechanically and electrically coupled to one another with an insert 117. The insert 117 is preferably integral to the module case 112 and manufactured from an electrically conductive material to provide the electrical coupling. In one embodiment, the insert 117 includes a threaded exterior surface 122 for coupling to a complementary threaded interior surface 124 of the module tip 120.

Disposed between the module tip 120 and the sensor electronics package 116 is an isolator 115 for isolating the sensor electronics package from damaging mechanical shock axially induced in the sensor module 110. The isolator 115 may comprise one or more layers 115a and 115b of vibration-isolating material. In one embodiment, a first isolating layer 115a adjoins the electronics package 116 and a second isolating layer 115b. The second isolating layer 115b adjoins the first isolating layer 115a and the module tip 120. In one embodiment the first isolating layer 115a is manufactured from a material such as silicone, and the second isolating layer 115b is manufactured from a material such as a high-damping polyurethane foam. A second, and similarly constructed isolator 130 is disposed between the sensor electronics package 116 and the module cap 114.

The sensor electronics package 116 and the isolators 115 and 130 are placed in slight compression when assembled inside the module case 112. Movement of the sensor electronics package 116 is constrained by an interior surface of the module case 112 and by the module cap 114 and tip 120 to provide limited movement in three translational and three angular axes.

FIGS. 2A and 2B illustrate the sensor electronics package 116. The sensor electronics package 116 includes a sensor assembly 222 and a host assembly 224. The sensor assembly 222 and the host assembly 224 each preferably comprise four sides. A horizontal isolator 228 and a side cap 226 are coupled to each side of the respective assemblies 222 and 224. Each horizontal isolator 228 may be made from a high-damped polyurethane foam material however.

Each side cap 226 is preferably made from a thermoplastic material. Alternatively, the side caps 226 may be constructed using any suitable material. Each side cap 226 has a tapered outer surface to interface with an internal tapered surface of the module case 112 (see FIG. 1A). The electronics package 116 and the horizontal isolators 228 are in compression when the sensor module 110 is assembled and substantially all of the electronics package 116 is surrounded by a layer of isolating material formed by the several horizontal isolators 228 and end isolators 115 and 130.

Suitable fasteners such as screws 232 are used to secure the side caps 226 to the sensor assembly 222 and to the host assembly 224. As shown, it is preferred to provide openings 234 in the horizontal isolators so that the screw heads will pass through the horizontal isolators 228. In this fashion, the screws 232 mechanically secure the side caps 226 without interfering with the isolating properties of the horizontal isolators 228.

A ground lead 227 electronically couples the host assembly 224 to a ground spring 229. The ground spring 229 contacts the insert 117 (see FIG. 1a) when the sensor module 110 is assembled, thus creating a direct electrical path to ground from the host assembly 224.

In the embodiment shown in FIGS. 2A and 2b, the sensor assembly 222 and the host assembly 224 are mechanically attached to each other. Alternatively, their structures may be separated to accommodate various module shapes. Alternatively, the horizontal isolators 228a–d may be constructed with any suitable damping material.

The sensor assembly 222 includes one or more sensors 230a–c. The sensors 230a–c will be described in more detail with respect to the embodiment shown in FIGS. 3A and 3B.

Figure 3:
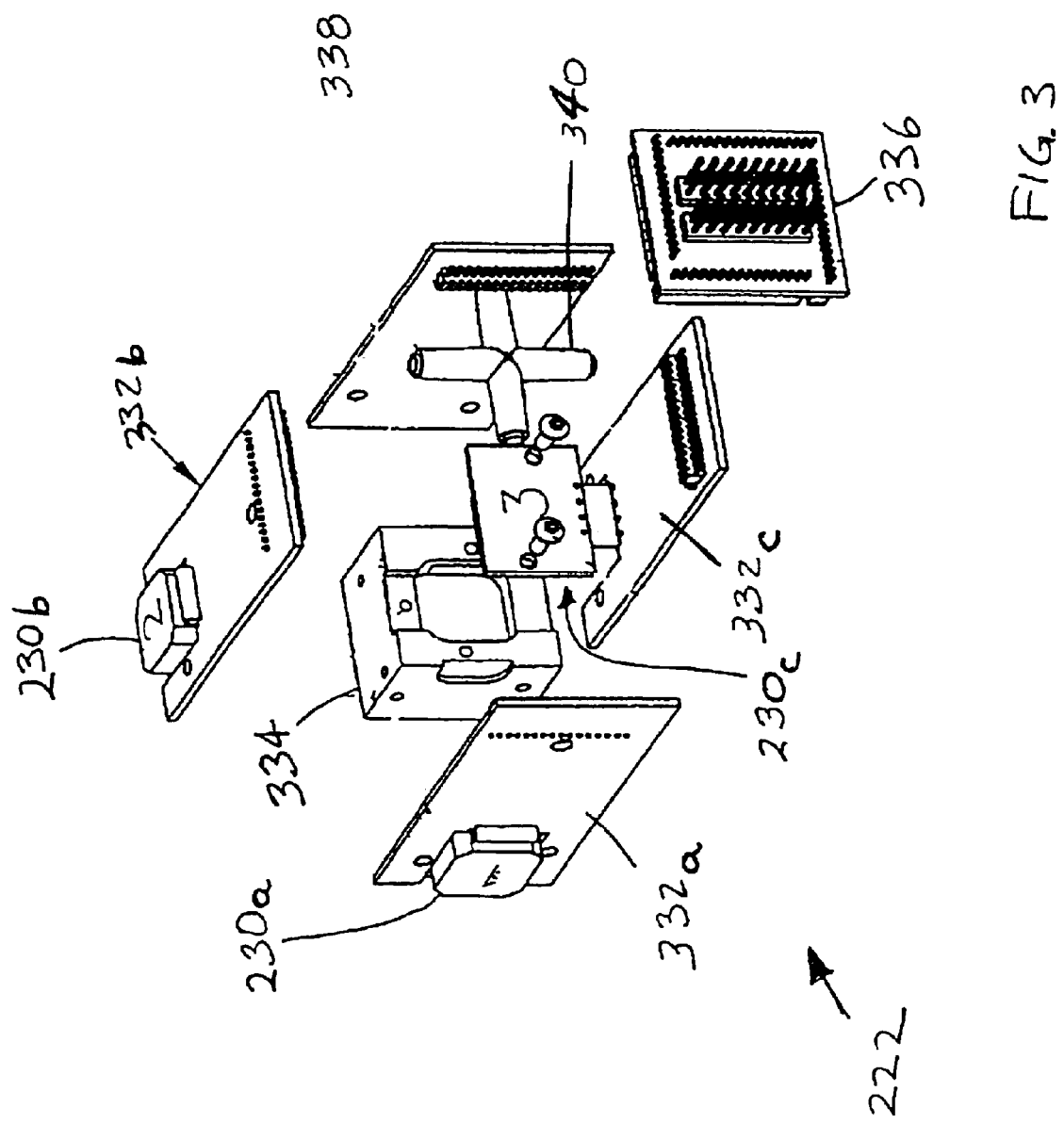
FIG. 3 is an exploded view of the sensor assembly of FIG. 2A.

FIG. 3 shows the sensor assembly 222 of FIG. 2A. The sensor assembly 222 includes sensors 230a, 230b, and 230c mounted on sensor boards 332a, 332b, and 332c. The sensor boards 332a–c are attached to a block 334, to a connector board 336 and to a regulator board 338. A standoff 340 is used for added stability for the boards 332a–c and 338. The sensors 230a–c are preferably MEMS accelerometers. The block 334, sometimes referred to as an inertial mass, is preferably made from aluminum and is machined so that the sensors 230a–c have substantially orthogonal axes of sensitivity. The mass of the block 334 provides noise reduction and abatement during operation of sensor module 110. The inertia of the mass helps damp resonance tones caused by the natural frequency of the sensor module structure.

Alternatively, the block 334 may be constructed in another shape to allow for a specific desired sensor module diameter or to adjust the mass of the sensor assembly 222. Also, the block may be shaped to provide non-orthogonal axes of sensitivity.

Figure 4:
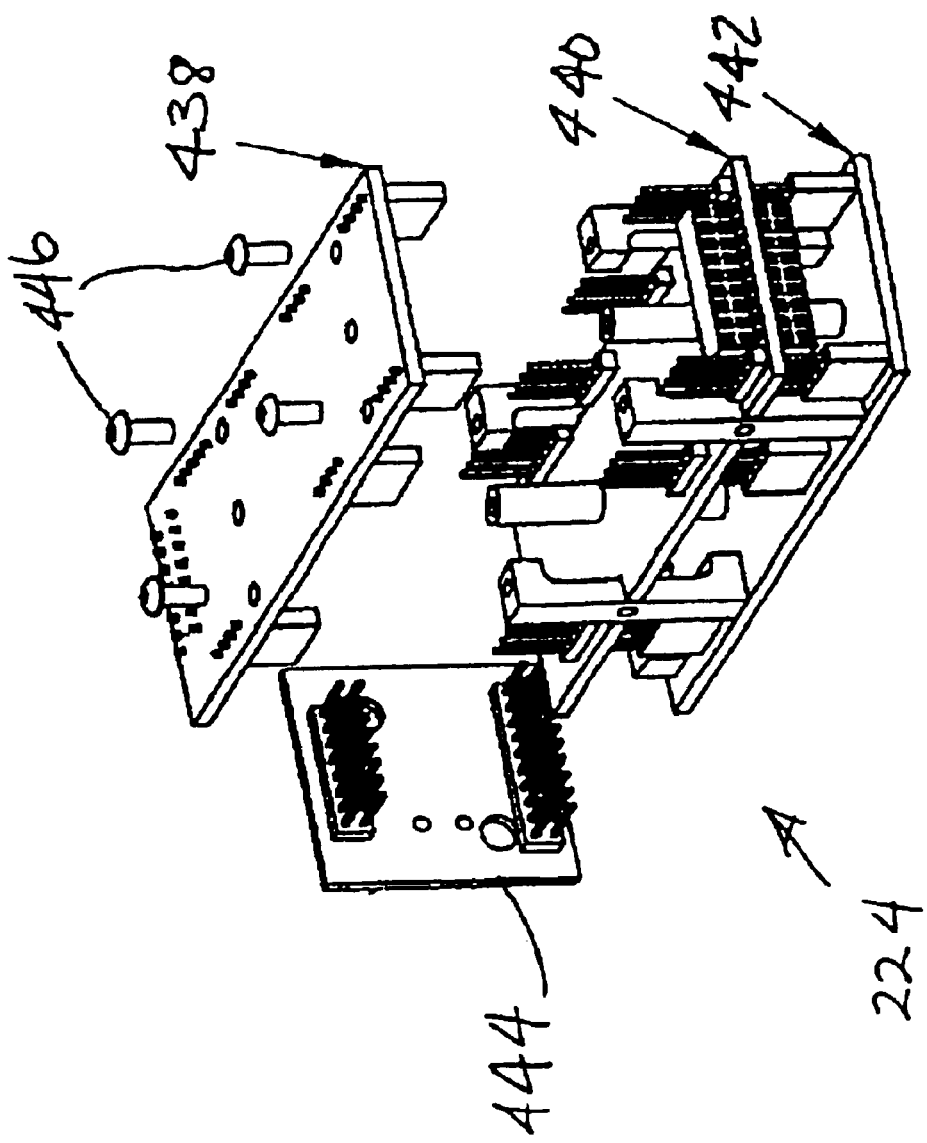
FIG. 4 is an elevation view of the host assembly of FIG. 2A.

The host assembly 224 is illustrated with more detail in FIG. 4. The host assembly 224 includes a telemetry board 438, a controller board 440, and a power supply board 442. The boards 438, 440 and 442 are electrically coupled to a telemetry interface board 444. Any fastener 446 known in the art may be used to mechanically couple the several boards 438–444.

Figure 5:
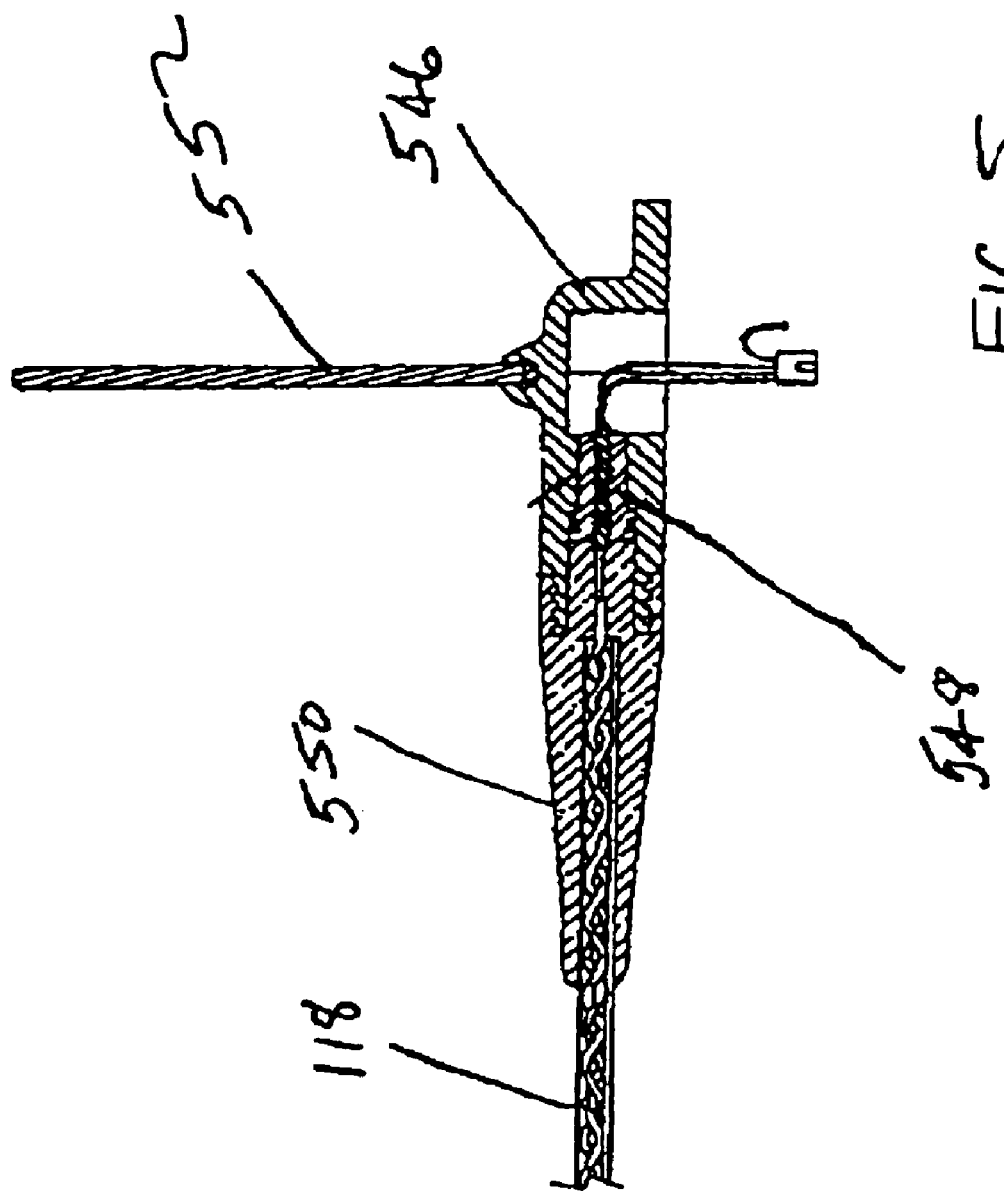
FIG. 5 illustrates the module cap of FIG. 1B.

Referring now to FIG. 1B and FIG. 5 the module cap 114 of FIG. 1B will be described in more detail. FIG. 5 is a cross section view of the module cap 114 and telemetry cable 118. The module cap 114 includes an end cap 546. The end cap 546 has a rope handle 552 connected thereto as a handle to aid in deployment and retrieval of the sensor module 110. The telemetry cable 118 terminates at a feedthrough 548 formed in the end cap 546. The feedthrough 548 preferably is a bulkhead feedthrough connector with sealed contacts having a seal around the connector diameter to prevent the intrusion of water into the sensor module 110. An overmold 550 prevents water intrusion into the telemetry cable 118 and provides strain relief for the telemetry cable 118. When assembled, the sensor module 110 is preferably a hermetically sealed unit.

The several embodiments of the present invention described above and shown in FIGS. 1A–5 reduce sensor module sensitivity to shock loading, and improve accelerometer alignment. The invention described preferably includes an orthogonal arrangement of three MEMS accelerometers. The accelerometers are mounted precisely within a module case to maintain their relative orientation within a predetermined alignment specification. Additionally, an isolation system has been described that provides protection for the sensors from high-g shock loads while maximizing coupling to sub-g inputs. The isolation aspect includes a combination of rigidity, internal damping, and allowable travel. The isolation aspect of the invention further includes an inertial mass coupled to the sensors for noise abatement during operation caused by sensor module resonance.

The embodiments described above by way of example do not limit the scope of the invention or prevent other embodiment developed by those skilled in the art with the benefit of this disclosure from being within the scope of the invention. For example, other module designs or deployment methods may be used as particular requirements dictate.

In an alternative embodiment, the cable 118 shown in FIG. 5 may be located on the top of the module cap 114 to provide and axially-oriented feedthrough.

In another embodiment (not shown) of the invention, a box-shaped module instead of the shown cylinder-shaped module may be advantageous. The box module may have all electronics in a box. The box would have spikes on a bottom side for coupling the box module to the ground.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An apparatus for sensing seismic waves in the earth, the apparatus comprising:
   (a) a housing;
   (b) one or more seismic sensors disposed in the housing; and
   (c) at least one isolator coupled to the one or more seismic sensors for isolating the one or more seismic sensors from high-g shock induced in the housing, the high-g shock being a shock of one g or more, wherein the at least one isolator further comprises a first layer of silicone rubber and a second layer of polyurethane foam.

2. The apparatus of claim 1, wherein the at least one isolator is disposed to provide isolation from the induced vibrations in at least one predetermined direction.

3. The apparatus of claim 2, wherein the at least one predetermined direction further comprises directions along three translational axes and three angular axes.

4. The apparatus of claim 1, further comprising an electronics package disposed in the housing and wherein the at least one sensor form at least a portion of the electronics package.

5. The apparatus of claim 1, further comprising a block as an inertial mass operatively associated with the one or more sensors.

6. The apparatus of claim 1, wherein the one or more sensors are accelerometers.

7. The apparatus of claim 6, wherein the one or more accelerometer sensors are three accelerometers disposed to provide three orthogonal axes of sensitivity.

8. The apparatus of claim 6, wherein the one or more accelerometers are MEMS accelerometers.

9. The apparatus of claim 1, further comprising a cap coupled to the housing, the cap having a feedthrough for providing conductor access to the one or more seismic sensors.

10. The apparatus of claim 9, wherein the cap and housing are coupled to form a sealed sensor module.

11. The apparatus of claim 10, wherein the sealed sensor module is hermetically sealed.

12. A seismic sensor module tolerant to high-g shock inputs, the high-g shock inputs being inputs of one g or more, the seismic sensor module comprising:
   (a) a module case;
   (b) a sensor assembly housed by the module case, wherein the sensor assembly includes an inertial mass and at least one seismic sensor coupled to the inertial mass: and
   (c) at least one isolator coupled to the sensor assembly and the module case, wherein the at least one isolator further comprises a first layer of silicone rubber and a second layer of polyurethane foam.

13. The seismic sensor module of claim 12, wherein the module case is adapted to provide a compressive force on the at least one isolator.

14. The seismic sensor module of claim 12, wherein the at least one seismic sensor is a MEMS accelerometer.

15. The sensor module of claim 14, wherein the at least one MEMS accelerometer further comprises three MEMS accelerometers disposed to provide three orthogonal axes of sensitivity.

16. The seismic sensor module of claim 12, wherein the at least one isolator is disposed to provide isolation from the induced vibrations in at least one predetermined direction.

17. The sensor module of claim 16, wherein the at least one predetermined direction further comprises directions along three translational axes and three angular axes.

18. The seismic sensor module of claim 12 further comprising
   a cap coupled to the module case, the cap having a feedthrough for providing conductor to the one or more seismic sensors.

19. The sensor module of claim 18, wherein the cap and module case are sealed.

20. The sensor module of claim 19, wherein the sealed sensor module is hermetically sealed.

21. A sensor module tolerant to high-g shock inputs, the high-g shock inputs being inputs of one g or more, the sensor module comprising:
   (a) a module case;
   (b) a sensor assembly within the module case, the sensor assembly having an inertial mass coupled to the module case and to one or more seismic sensors coupled to the inertial mass; and
   (c) an isolation layer coupled to the module case and to the sensor assembly, wherein the sensor assembly does not move relative to the module case when an input force of less than a predetermined level is applied to the module case, wherein the at least one isolator further comprises a layer of silicone rubber and a layer of polyurethane foam.

22. The sensor module of claim 21, wherein the predetermined level is 1 g.

23. The sensor module of claim 21, wherein the at least one isolator is disposed to provide isolation from the induced vibrations in at least one predetermined direction.

24. The sensor module of claim 23, wherein the at least one predetermined direction further comprises directions along three translational axes and three angular axes.

25. The sensor module of claim 21, wherein the one or more sensors are accelerometers.

26. The sensor module of claim 21, wherein the one or more sensors are three accelerometers disposed to provide three orthogonal axes of sensitivity.

27. The sensor module of claim 21, wherein the one or more sensors are MEMS accelerometers.

28. The sensor module of claim 21, further comprising a cap coupled to the module case, the cap having a feedthrough for providing conductor access to the one or more seismic sensors.

29. The sensor module of claim 28, wherein the cap and module case are sealed.

30. The sensor module of claim 29, wherein the sealed sensor module is hermetically sealed.

31. A method of isolating one or more seismic sensor in a seismic sensor module from high-g shock loads while maintaining sensitivity to seismic waves the high-g shock loads being shock loads of one g or more, the method comprising:

(a) providing a housing for the seismic sensor assembly;

(b) installing one or more seismic sensors in the housing;

(c) providing at least one isolator between the one or more sensors and the housing, wherein providing the at least one isolator further comprises providing a layer of silicone rubber and a layer of polyurethane foam.

32. The method of claim 31 further comprising coupling an inertial mass to the one or more seismic sensors.

33. The method of claim 31, wherein the at least one isolator is disposed to provide isolation from the induced vibrations in at least one predetermined direction.

34. The method of claim 33, wherein the at least one predetermined direction further comprises directions along three translational axes and three angular axes.

35. The method of claim 31 further comprising reducing noise during operation of the sensor module using an inertial mass coupled to the one or more sensors.

36. The method of claim 31, wherein the one or more sensors are accelerometers.

37. The method of claim 31, wherein the one or more sensors are three accelerometers disposed to provide three orthogonal axes of sensitivity.

38. The method of claim 31, wherein the one or more sensors are MEMS accelerometers.

39. The method of claim 31, wherein the sensor assembly further comprises a cap coupled to the housing, the cap having a feedthrough for providing conductor access to the one or more seismic sensors, the method further comprising sealing the cap and housing to form a sealed sensor module.

40. The method of claim 39, wherein the sealed sensor module is hermetically sealed.

* * * * *